(12) United States Patent
Kayanuma

(10) Patent No.: US 8,023,382 B2
(45) Date of Patent: Sep. 20, 2011

(54) INFORMATION REPRODUCTION APPARATUS AND INFORMATION REPRODUCTION METHOD

(75) Inventor: Kinji Kayanuma, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 0 days.

(21) Appl. No.: 12/827,090

(22) Filed: Jun. 30, 2010

(65) Prior Publication Data

US 2011/0013500 A1  Jan. 20, 2011

(30) Foreign Application Priority Data

Jul. 14, 2009  (JP) ................................. 2009-166039

(51) Int. Cl.
*G11B 7/00* (2006.01)
(52) U.S. Cl. .................. 369/59.22; 369/53.16
(58) Field of Classification Search ............... 369/59.25, 369/44.39, 53.2, 275.3, 275.1, 53.17, 124.09, 369/47.2, 47.15, 47.19, 124.05, 124.11
See application file for complete search history.

(56) References Cited

U.S. PATENT DOCUMENTS 7,411,888 B2 * 8/2008 Watabe et al. .............. 369/275.3

FOREIGN PATENT DOCUMENTS

| JP | 11-330986 | 11/1999 |
| JP | 2008-262611 | 10/2008 |

* cited by examiner

*Primary Examiner* — Nabil Z Hindi
(74) *Attorney, Agent, or Firm* — Young & Thompson

(57) ABSTRACT

A small size circuit reproducing data with low error rate even when a signal includes a non-linear distortion is desired. In such a circuit, the Viterbi method is performed. In the Viterbi method, branch metrics are calculated based on a difference of a sampled reproduction signal and a predetermined expectation values. Path metrics are calculated from the branch metrics. Paths among the plurality of paths having the calculated path metrics and merging at a same state are compared with one another. Based on the magnitude of the compared path metrics, survivor path is selected. In the circuit, for the path metrics of paths merging at a same state, offset corresponding to a determination result until a merging point is added to the paths for the comparison for determining the survivor path from the plurality of merging paths.

12 Claims, 16 Drawing Sheets

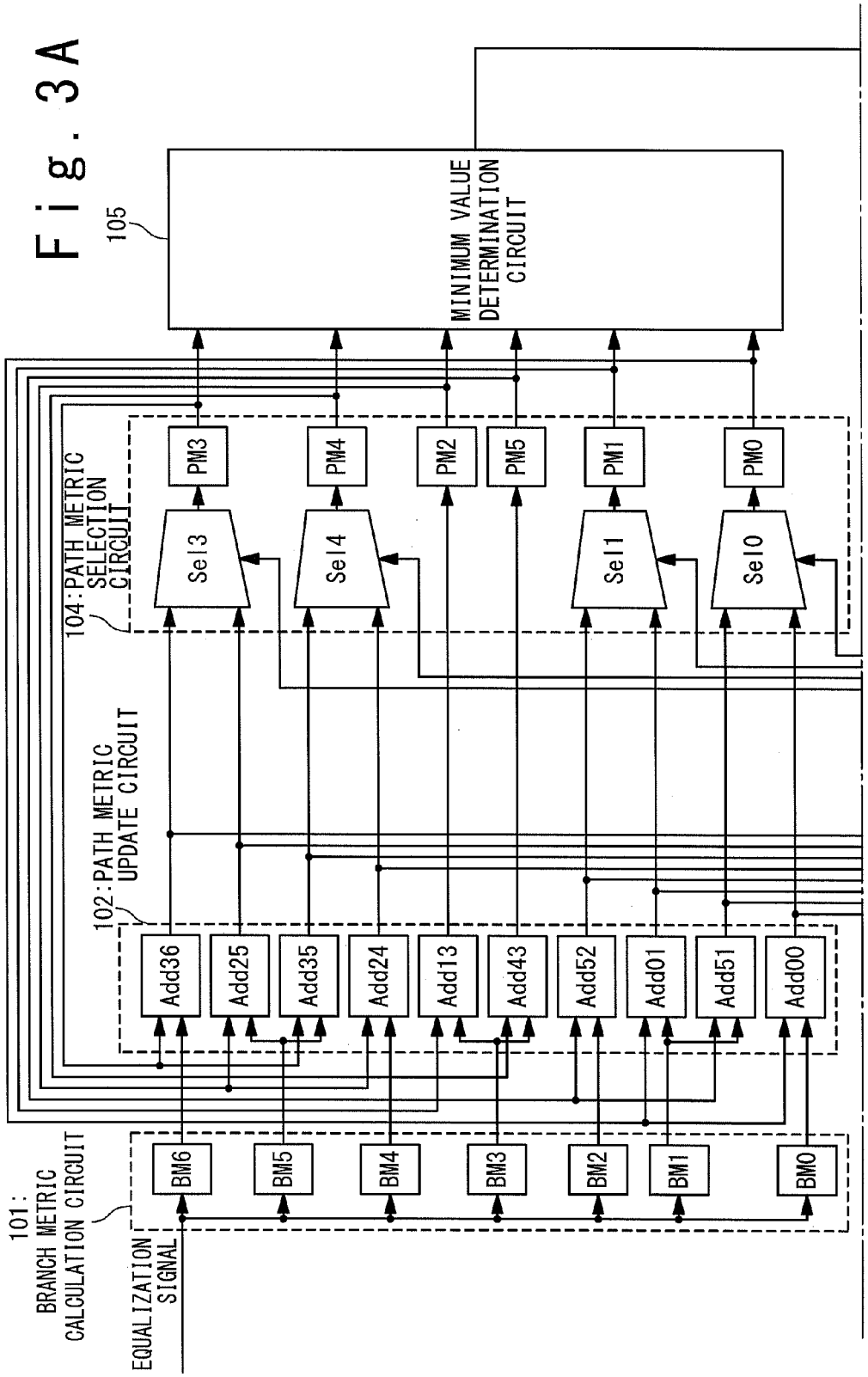

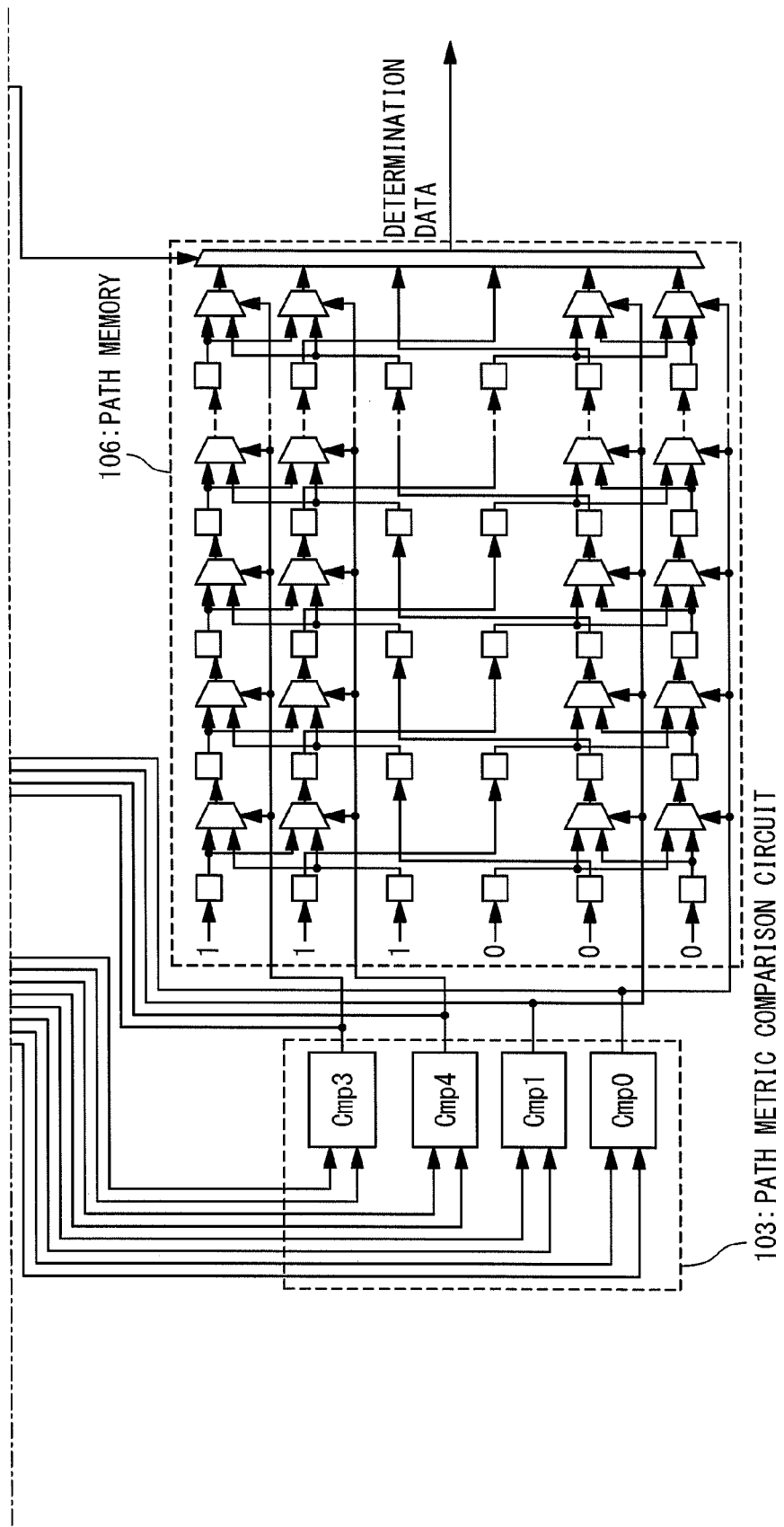

WHEN WAVEFORM DISTORTION IS SMALL

WHEN WAVEFORM DISTORTION IS LARGE

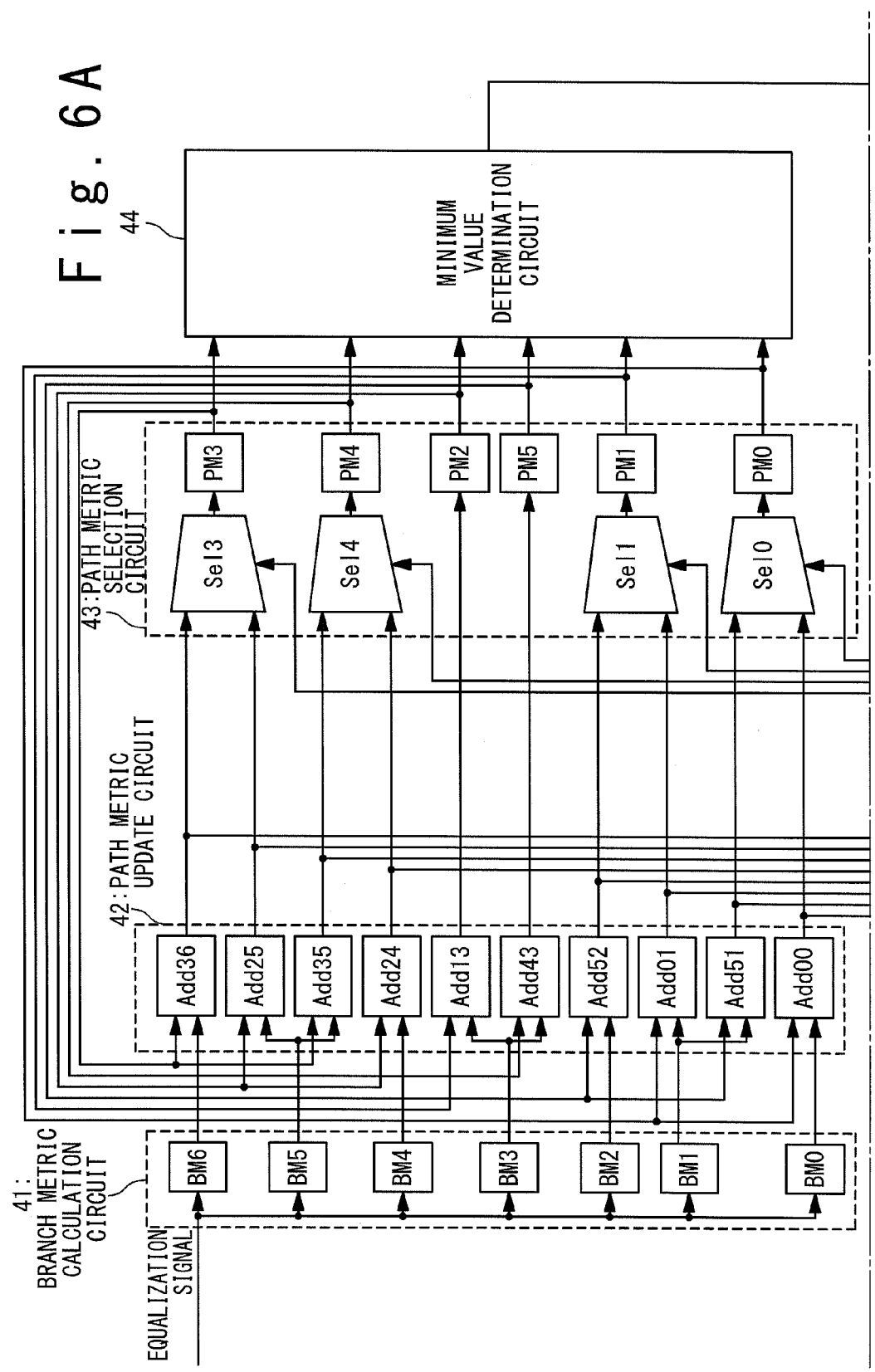

Fig. 7A

PATH PATTERN IN WHICH MERGING OCCURS AT S0

| CLASSIFICATION NUMBER | PATH INFORMATION OF S0→S0 | PATH INFORMATION OF S5→S0 | PATH METRIC DIFFERENCE OF IDEAL WAVEFORMS |
|---|---|---|---|
| 1 | XX000[00] | XX110[00] | 36 |
| 2 | 11100[00] | 11110[00] | 10 |
| 3 | 11100[00] | 01110[00] | 18 |
| 4 | 11100[00] | 00110[00] | 36 |
| 5 | 01100[00] | 11110[00] | 22 |
| 6 | 01100[00] | 01110[00] | 10 |
| 7 | 01100[00] | 00110[00] | 12 |

Fig. 7B

PATH PATTERN IN WHICH MERGING OCCURS AT S1

| CLASSIFICATION NUMBER | PATH INFORMATION OF S0→S1 | PATH INFORMATION OF S5→S1 | PATH METRIC DIFFERENCE OF IDEAL WAVEFORMS |
|---|---|---|---|
| 1 | XX000[01] | XX110[01] | 36 |
| 2 | 11100[01] | 11110[01] | 10 |
| 3 | 11100[01] | 01110[01] | 18 |
| 4 | 11100[01] | 00110[01] | 36 |
| 5 | 01100[01] | 11110[01] | 22 |
| 6 | 01100[01] | 01110[01] | 10 |
| 7 | 01100[01] | 00110[01] | 12 |

Fig. 7C

PATH PATTERN IN WHICH MERGING OCCURS AT S3

| CLASSIFICATION NUMBER | PATH INFORMATION OF S3→S3 | PATH INFORMATION OF S2→S3 | PATH METRIC DIFFERENCE OF IDEAL WAVEFORMS |
|---|---|---|---|
| 1 | XX111[11] | XX001[11] | 36 |
| 2 | 00011[11] | 00001[11] | 10 |
| 3 | 00011[11] | 10001[11] | 18 |
| 4 | 00011[11] | 11001[11] | 36 |
| 5 | 10011[11] | 00001[11] | 22 |
| 6 | 10011[11] | 10001[11] | 10 |
| 7 | 10011[11] | 11001[11] | 12 |

Fig. 7D

PATH PATTERN IN WHICH MERGING OCCURS AT S4

| CLASSIFICATION NUMBER | PATH INFORMATION OF S3→S4 | PATH INFORMATION OF S2→S4 | PATH METRIC DIFFERENCE OF IDEAL WAVEFORMS |
|---|---|---|---|
| 1 | XX111[10] | XX001[10] | 36 |
| 2 | 00011[10] | 00001[10] | 10 |
| 3 | 00011[10] | 10001[10] | 18 |
| 4 | 00011[10] | 11001[10] | 36 |
| 5 | 10011[10] | 00001[10] | 22 |
| 6 | 10011[10] | 10001[10] | 10 |
| 7 | 10011[10] | 11001[10] | 12 |

PATH METRIC DISTRIBUTION BEFORE OFFSET ADDITION

DISTRIBUTION AFTER ADDITION OF OFFSET TO Pb

INFORMATION REPRODUCTION APPARATUS AND INFORMATION REPRODUCTION METHOD

INCORPORATION BY REFERENCE

This Patent Application is based on Japanese Patent Application No. 2009-166039. The disclosure of the Japanese Patent Application is incorporated herein by reference.

BACKGROUND OF THE INVENTION

1. Field of the Invention

The present invention relates to an information reproduction apparatus and an information reproduction method, and more particularly relates to an information reproduction apparatus and an information reproduction method which can obtain a low determination error rate, even when a reproduction signal has a nonlinear distortion.

2. Description of Related Art

In recent years, the recording density of optical disc recording/reproducing apparatuses is increasing. In such apparatuses having high density, the PRML (Partial-Response Maximum-Likelihood) signal process is adopted in the signal reproduction process, in many cases. The PRML signal process carries out a waveform equalization corresponding to properties of the recording/reproducing system, and determines a data based on the maximum-likelihood detection through a Viterbi detector and can attain a low error rate even for a reproduction signal in which an inter-code interference is large. However, in the PRML signal process, there is a case that the original performance of the PRML is not sufficiently provided because of the nonlinear distortion of the reproduction signal that is generated in association with the marks formed in high density.

At first, the PRML signal process is described with reference to FIGS. 1, 2, 3A and 3B. FIG. 1 is a state transition diagram of a reproduction signal sequence that is sampled at a channel bit interval, when as a modulation code, a code in which a minimum code inversion interval is 2 is used to carry out a recording/reproducing operation and then the reproduction signal is PR (a, b, b, a) equalized. States S0 to S5 indicate states determined from three channel bits that include the channel bits immediately before and immediately after. The states S0, S1 and S5 indicate the states in which current channel bit is [0]. The states S2, S3 and S4 indicate that the current channel bit is [1]. Symbols r0 to r6 indicated on arrow marks that represent shifts between the states are the expectation values of the reproduction signals corresponding to the respective shifts. The expectation values r0 to r6 are represented by the equations (1) to (7), respectively, in the case of PR (a, b, b, a).

$$r0 = -b - a \quad (1)$$

$$r1 = -b \quad (2)$$

$$r2 = -b + a \quad (3)$$

$$r3 = 0 \quad (4)$$

$$r4 = b - a \quad (5)$$

$$r5 = b \quad (6)$$

$$r6 = b + a \quad (7)$$

FIG. 2 is a trellis diagram obtained by developing the state transition diagram in FIG. 1 in the time axis direction. In the trellis diagram, considering the combinations of all paths generated through any state from any state corresponds to consider all bit sequences in which the constraints of the signs are considered. In the PRML signal process, ideal waveforms that are expected for all the paths included in the trellis diagram are compared with the reproduction signal actually reproduced from an optical disc. Then, in the PRML signal process, the path having the ideal waveform that is closest to the reproduction signal is selected to specify the most probable channel bit sequence in accordance with the path.

With reference to the trellis diagram in FIG. 2, two arrow marks merge in each of the states S0, S1, S3 and S4 at any time. The Viterbi detector used in the PRML signal process compares indexes that indicate the respective closenesses between the ideal waveforms expected corresponding to the paths and the waveform of the reproduction signal, for the states S0, S1, S3 and S4 in which plurality of arrow marks merge as mentioned above. Then, the Viterbi detector proceeds with the path selection by leaving the path, which is the closest to the ideal waveform, one by one, for each state. As the Viterbi detector proceeds with the path selection, the six paths equal to the number of the states are left at a certain time. The number of the survivor paths is decreased with the passage of time. Then, the six paths become coincident at some time. The Viterbi detector sequentially outputs only the range in which the paths are coincident. In this way, the PRML signal process can obtain the most probable channel bit sequence from the reproduction signal. For the index indicating the closeness between an ideal waveform and a reproduction signal waveform, a path metric corresponding to the value obtained by squaring the Euclidean distance between both of the waveforms is used. The path metric is obtained by totaling the branch metric obtained for each arrow mark for coupling the states along the path.

FIGS. 3A and 3B show a configuration example of a Viterbi detector. With reference to FIGS. 3A and 3B, the Viterbi detector contains a branch metric calculation circuit 101, a path metric update circuit 102, a path metric comparison circuit 103, a path metric selection circuit 104, a minimum value determination circuit 105 and a path memory 106.

The branch metric calculation circuit 101 receives an equalization signal obtained by performing an equalization of a waveform on the sampled reproduction signal sequence. The branch metric calculation circuit 101 includes a plurality of sub blocks (BM0 to BM6). The respective sub blocks (BM0 to BM6) calculate a blanch metric $B_n[t]$ from the equation (8), in accordance with a sample value $y[t]$ of the equalization signal and the expectation values r0 to r6.

$$B_n[t] = r_n^2 - 2r_n y[t] \quad (n=0,\ ---\ 6) \quad (8)$$

The expectation value $r_n$ used in the sub block BMn is a fixed value. Thus, when a and b have a relation of an integer ratio, the branch metric calculation circuit 101 can be realized by using a few adders without using a multiplier. For example, when a is 1 and b is 2, the expectation value $r_n$ becomes an integer between −3 and 3. Thus, the first term of $B_n[t]$ is a constant, and the second term is represented by the multiplication of a constant between 6 and −6 and $y[t]$. When the value is represented by the two's complement, the two times is represented by a 1-bit shift, the four times is represented by a 2-bit shift, and a value of six times is represented by the addition of the value of two times and the value of four times. Also, the minus number is obtained only by inverting the polarities of all bits. Thus, the circuit quantity required to obtain the $B_n[t]$ is the two adders and the circuits for inverting the polarities of all the bits.

The path metric update circuit 102 includes a plurality of adders (Add00, Add51, Add01, Add52, Add43, Add13, Add24, Add35, Add25 and Add36) as sub blocks. Each adder calculates a candidate of the path metric at a time t, in accordance with the value of the path metric $P_m[t-1]$ immediately before and corresponding to the state Sm (m=0, - - - 5) and the branch metric $B_n[t]$ and outputs it. For example, the adder Addmn in a sub block functions to calculate the path metric of the path, which passes through the state Sm at of a time t−1 and further passes through the arrow mark of the expectation value $r_n$ and then transitions to a next state.

In other words, exemplifying a case of m=0, the path metric update circuit 102 calculates candidates of a path metric correlated to a third state S3 at time t based on a plurality of branch metrics, the first path metric $P_0[t-1]$ correlated to a first state S0 at time t−1 and the second path metric $P_5[t-1]$ correlated to a second state S5 at time t−1. Assuming that such candidates is represented as a third path metric and a fourth path metric. The third path metric can be calculated from a first branch metric $B_0[t]$ included in a plurality of branch metrics $B_n[t]$ (n=0, . . . , 6) and the first path metric $P_0[t-1]$. The fourth path metric can be calculated from a second branch metric $B_1[t]$ and the second path metric $P_5[t-1]$.

The path metric comparison circuit 103 includes a plurality of comparators (Cmp0, Cmp1, Cmp3 and Cmp4) as sub blocks. Each of the plurality of comparators compares the magnitudes of the path metrics outputted by the path metric update circuit 102, in a state in which a plurality of paths merge, and outputs a selection signal indicating the comparison result.

The path metric selection circuit 104 includes a plurality of selectors (Se10, Se11, Se13 and Se14) and a plurality of registers (PM0, PM1, PM2, PM3, PM4 and PM5) as sub blocks. Each of the plurality of selectors selects the value of the path metric that is determined to be smaller, in accordance with the selection signal received from the path metric comparison circuit 103. Each of the plurality of registers updates and holds the path metric $P_n[t]$ of the time t corresponding to each of the states. In the aforementioned case, the path metric selection circuit 104 selects smaller one of the third path metric and the fourth path metric and hold the selected one with the third state at time t. The path metric update circuit 102, the path metric comparison circuit 103 and the path metric selection circuit 104 are the main elements of the Viterbi detector that are mainly composed of adders, comparators and selectors, respectively, and is referred to as the ACS (Add-Compare-Select) circuit, in many cases. The ACS circuit in FIG. 3 updates the path metric at any time t, in accordance with the equations (9) to (14).

$$P_0[t]=\min(P_0[t-1]+B_0[t], P_5[t-1]+B_1[t]) \quad (9)$$

$$P_1[t]=\min(P_0[t-1]+B_1[t], P_5[t-1]+B_2[t]) \quad (10)$$

$$P_2[t]=P_1[t-1]+B_3[t] \quad (11)$$

$$P_3[t]=\min(P_2[t-1]+B_5[t], P_3[t-1]+B_6[t]) \quad (12)$$

$$P_4[t]=\min(P_2[t-1]+B_4[t], P_3[t-1]+B_5[t]) \quad (13)$$

$$P_5[t]=P_4[t-1]+B_3[t] \quad (14)$$

The symbol min (A, B) represented in the equations indicates the process of selecting the smaller value from A and B. The numbers of arrow marks directed to the states S2 and S5 are respectively one. Thus, the min (A, B) is not used to update $P_2[t]$ and $P_5[t]$.

The minimum value determination circuit 105 compares $P_0[t]$ to $P_5[t]$ that indicate the path metrics in the respective states and determines the path metric having the smallest value. Then, the minimum value determination circuit 105 outputs the determination result to the path memory 106.

The path memory 106 includes a plurality of registers (the rectangular blocks on the drawing) and a plurality of selectors (the trapezoidal blocks on the drawing). The path memory 106 holds the path selected by the path metric selection circuit 104, as path information represented by the channel bit, in accordance with the selection signal outputted by the path metric comparison circuit 103. The register group on the lowest stage in the path memory 106 in FIG. 3 holds the path information corresponding to the path which traces back to the state S0. The register groups thereon correspond to the paths, which trace back to the state S1, state S5, state S2, state S4 and state S3, in the order from the bottom. Each register stores one bit in the channel bit of the corresponding path, and each bit is sent to the column to the right one at a time with the passage of time. At the time t, the register of the column of the left end in the register group in each stage holds the channel bit of the time t. Then, the column immediately to the right holds the channel bit of the time t−1, and the next column of the right thereof holds the channel bit of the time t−2. When the path memory 106 contains the registers of about 30 columns, a same value is held in the registers of all the stages at a high probability, in the column of the right end. It is possible to obtain the result of the Viterbi detection even by selecting any one stage from the column of the right end of the path memory 106 and outputting one bit at a time. In the example in FIG. 3B, the selector for selecting the path from which the channel bit is taken out from the paths which respectively trace back from the states S0 to S5, so as to be able to output more probable value, even when the value of the channel bit contained in the register of the column of the right end is different depending on the stage. The selector of the right end of the path memory 106 selects and outputs the channel bit of the stage corresponding to the state in which the path metric is minimum at each time, in accordance with the determination result of the minimum value determination circuit 105.

In Japanese Patent Application Publication JP-A-Heisei, 11-330986, which is referred to as the patent document 1 below, techniques related to the PRML signal process is disclosed. The patent document 1 proposes an apparatus for correcting the expectation value used to calculate the branch metric, on the basis of an offset amount and a nonlinear distortion quantity, which depend on the property of a recording medium and the property of a reproducing system. The expectation value $r_n$ is corrected in response to the trend of the distortion generated in the reproduction signal. Consequently, the path metric for each path is accurately obtained, and determination errors can be reduced.

Japanese Patent Application Publication JP-P 2008-262611A, which is referred to as the patent document 2 below, discloses a decoding method in which an offset is added to the path metric corresponding to a predetermined path. The path metric difference between the ideal waveforms corresponding to the merging two paths has a value that is different depending on the path. For example, in an example of PR (1, 2, 2, 1), in the trellis diagram in FIG. 2, the path metric difference is 10 between the ideal waveforms, which correspond to the two paths S0→S1→S2→S3→S3 and S0→S0→S1→S2→S3 that pass through the state S0 at a time t−4 and merge at the state S3 at a time t. The path metric difference is 12 between the ideal waveforms, which correspond to the two paths S0→S0→S0→S0→S0→S0 and S0→S1→S2→S4→S5→S0 that pass through the state S0 at a time t−5 and merge at the state S0 at the time t. In the patent document 2, as indicated in the two paths that pass through the state S0 at the time t−5 and merge at the state S0 at the time t, the process is carried out to add the offset to the path metric, for the paths in which the expectation value of the path metric difference does not become minimum. The process of adding the offset to the path metric can correct a deviation appearing in the path metric, when the distortion exists in the reproduction signal having a large difference from the path metric obtained by another pattern, such as a reproduction signal obtained from a long mark. Thus, the effect of reducing the determination error can be expected.

SUMMARY

The PRML signal process is known to mark high detection performance when sample values after the reproduction signal is PR-equalized are distributed with a reference value obtained by the ideal waveform as a center and included noise is white. However, the PRML signal process has a problem of drop in a detection performance when the nonlinear distortion is included in the reproduction signal, because deviation is generated in the path metric indicating the likelihood of a path. In recent years, with an increase in the density of data recording, the influence of a thermal distribution generated by an optical beam cannot be neglected for the size of a recording mark. In order to make a mark as uniform as possible, a strength modulation is applied to the optical beam for scanning the medium. However, there are limits in the change rates of a modulation pattern and an optical beam magnitude, and a deviation is apt to appear in the shape of a short mark. The deviation of the mark length appears as a nonlinear distortion of the reproduction signal. This causes an increase of a detection error. In order to correctly determine the data recorded at high density, means is required to correctly select the most probable path even in a reproduction signal that includes a nonlinear distortion.

The patent documents 1, 2 are considered to be able to cope with to the aforementioned nonlinear distortion. However, the patent document 1 has a demerit that the circuit scale becomes large, because the expectation value $r_n$ is variable and the calculation of the branch metric is required to use a multiplier to which two variables are inputted. The increase in the circuit scale is not preferable because the electric power consumption and the cost are increased. In the patent document 2, the offset is directly given to the path metric. Thus, this has a demerit that, when the path determination is erroneous, it causes an increase in error in a subsequent path determination. For example, when two paths that pass through the state S0 at the time t−5 and merge at the state S0 at the time t are determined and when an offset is added to the path metric of the path of S0→S0→S0→S0→S0→S0, the value $P_0[t]$ of the path metric obtained thereby has influence on even the path selection on and after the time t+1. When the path selection at the time t is erroneous, the path metric $P_0[t]$ does not have a value reflecting the likelihood of the path, and there is a possibility that the determination error is continuously occurred.

Further, in a reproduction signal recorded in high density, the waveform distortion of the path in which the path metric difference between the ideal waveforms coincides with the minimum value mainly causes the increase in the error rate. For example, the path metric difference between the ideal waveforms which correspond to the two paths S2→S4→S5→S0→S1 and S2→S3→S4→S5→S1 that pass through the state S2 at the time t−4 and merge at the state S1 at the time t is the minimum value of 10. The Euclidean distance between both coincides with the minimum value of the paths that branch and again merge. Those waveforms are reproduction signals obtained from short marks which are apt to generate a waveform distortion, and they are apt to cause an increase in the error rate. However, the method indicated in the patent document 2 cannot correct the path metric between the two paths in which the Euclidean distance becomes the shortest. For this reason, there is also a problem that the effect of improving the error rate cannot be obtained, in a reproduction signal recorded in high density. Hence, an information reproduction apparatus and an information reproduction method are desired which can obtain a data determination result in which an error rate is low, in a small circuit scale, even if a nonlinear distortion is included in a reproduction signal.

According to an aspect of the present invention, an information reproduction apparatus includes: a branch metric calculation part for receiving an equalization signal being obtained by applying a waveform equalization to a sampled reproduction signal sequence, and calculating a plurality of branch metrics based on a sample value of the equalization signal at time t and a plurality of expectation values; a path metric update circuit for calculating a third path metric from a first branch metric included in the plurality of branch metrics and a first path metric being correlated to a first state at a time t−1 based on the plurality of branch metrics, the first path metric and a second path metric being correlated to a second state at a time t−1, and calculating a fourth path metric from a second branch metric included in the plurality of branch metrics and the second path metric; a path memory for holding first path information indicating a first path being correlated to the first state at the time t−1 represented by a channel bit sequence, and second path information indicating a second path being correlated to the second state at time t−1 represented by a channel bit sequence; a bias output circuit for outputting a first offset value based on the first path information and the second path information which are received from the path memory; and a path metric selection circuit for performing a selection among either of the third path metric or the fourth path metric, and holding a result of the selection with correlating to a third state at the time t.

According to another aspect of the present invention, an information reproduction method includes: receiving an equalization signal being obtained by applying a waveform equalization to a sampled reproduction signal sequence; calculating a plurality of branch metrics based on a sample value of the equalization signal at time t and a plurality of expectation values; calculating a third path metric from a first branch metric included in the plurality of branch metrics and a first path metric being correlated to a first state at a time t−1 based on the plurality of branch metrics, the first path metric and a second path metric being correlated to a second state at a time t−1; calculating a fourth path metric from a second branch metric included in the plurality of branch metrics and the second path metric; holding first path information indicating a first path being correlated to the first state at the time t−1 represented by a channel bit sequence, and second path information indicating a second path being correlated to the second state at time t−1 represented by a channel bit sequence; outputting a first offset value based on the first path information and the second path information which are received from the path memory; and performing a selection among either of the third path metric or the fourth path metric, and to hold a result of the selection with correlating to a third state at the time t.

The information reproduction apparatus and the information reproduction method according to the present invention, can select the most probable path in which the influence of a distortion is taken into account in response to the reproduction signal sequence, even when the reproduction signal includes a distortion. In particular, in the information reproduction apparatus and the information reproduction method according to the present invention, the error in the path determination can be reduced in a small circuit, and data can be stably reproduced without being influenced by the recording quality.

BRIEF DESCRIPTION OF THE DRAWINGS

The above and other objects, advantages and features of the present invention will be more apparent from the following description of certain preferred embodiments taken in conjunction with the accompanying drawings, in which:

FIG. 3A shows a configuration example of the Viterbi detector;

FIG. 3B shows a configuration example of the Viterbi detector;

FIG. 6A is a view showing a detailed configuration of a Viterbi detector 4;

FIG. 7A is a table in which the patterns of the paths merging at a state S0 held by a bias output circuit 47 are classified and indicated;

FIG. 7B is a table in which the patterns of the paths merging at a state S1 held by the bias output circuit 47 are classified and indicated;

FIG. 7C is a table in which the patterns of the paths merging at a state S3 held by the bias output circuit 47 are classified and indicated;

FIG. 7D is a table in which the patterns of the paths merging at a state S4 held by the bias output circuit 47 are classified and indicated;

DESCRIPTION OF THE PREFERRED EMBODIMENTS

Hereinafter, some exemplary embodiments of the information reproduction apparatus and the information reproduction method according to the present invention will be described below with reference to the attached drawings.

First Embodiment

Figure 4:
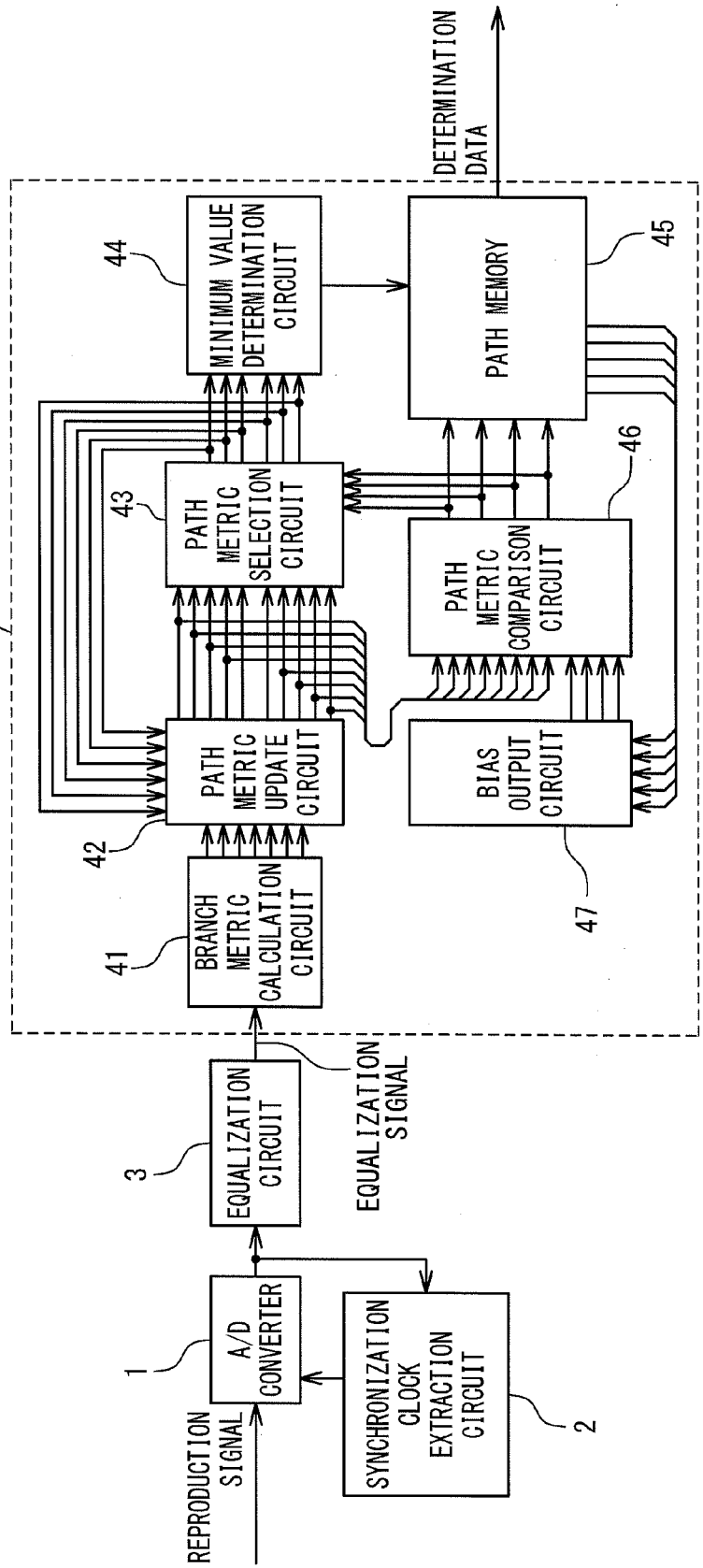
FIG. 4 is a block diagram showing an information reproduction apparatus according to a first embodiment of the present invention.

FIG. 4 is a block diagram of the information reproduction apparatus according to a first embodiment of the present invention. With reference to FIG. 4, the information reproduction apparatus contains an A/D converter 1, a synchronous clock extraction circuit 2, an equalization circuit 3 and a Viterbi detector 4.

The A/D converter 1 samples a reproduction signal in accordance with a sampling clock supplied by the synchronous clock extraction circuit 2. A digital data obtained by the sampling is fed back to the synchronous clock extraction circuit to keep an appropriate sampling timing corresponding to a data rate of the reproduction signal.

The equalization circuit 3 carries out a filtering in accordance with the sampled reproduction signal to output an equalization signal. The response characteristic of the equalization circuit 3 is predetermined corresponding to the reproduction signal so that the equalization signal is close to a desirable partial response waveform. In the explanation here, it is assumed that an equalization waveform is PR (a, b, b, a) equalized. When the reproduction signal is originally close to the PR (a, b, b, a) equalization waveform, the equalization signal can be equalized to be distributed with the 7 positions r0 to r6 that are the fixed reference values corresponding to the respective shifts as a center, without any large change in a frequency property. However, when the reproduction signal includes a nonlinear distortion, the average value of the distributions is deviated, and a variation appears in the distribution.

The Viterbi detector 4 can output a determination data with a low error rate even when receiving an equalization signal including a nonlinear distortion. The Viterbi detector 4 contains a branch metric calculation circuit 41, a path metric update circuit 42, a path metric selection circuit 43, a minimum value determination circuit 44, a path memory 45, a path metric comparison circuit 46 and a bias output circuit 47. The branch metric calculation circuit 41, the path metric update circuit 42, the path metric selection circuit 43 and the minimum value determination circuit 44 are similar to the circuits shown in FIGS. 3A and 3B, respectively.

Similarly to the branch metric calculation circuit 101, the branch metric calculation circuit 41 receives an equalization signal, which is obtained by performing the waveform equalization on the sampled reproduction signal sequence, from the equalization circuit 3. The branch metric calculation circuit 41 calculates the branch metric, in accordance with a sample value y[t] of the equalization signal at a time t and the plurality of expectation values r0 to r6 that are the fixed values. The expectation values are a possible value of the sample values of the equalization signal determined corresponding to the pattern of a channel bit sequence. The calculating method of the branch metric $B_n[t]$ is same to the equation (8).

Similarly to the path metric update circuit 102, the path metric update circuit 42 calculates and outputs path metric candidates at the time t, on the path that passes through the state Sm at the time t−1 and passes through the arrow mark of the expectation value $r_n$ and then shifts to the next state. This calculation is performed based on the branch metric $B_n[t]$ of the time t that is calculated by the branch metric calculation circuit 41 and the path metric $P_m[t-1]$ of the time t−1 immediately before which is held by the path metric selection circuit 43.

Similarly to the path metric selection circuit 104, the path metric selection circuit 43 receives the selection signal, which indicates the magnitude of the path metric, from the path metric comparison circuit 46 that will be described later, and selects and holds the path metric at the time t. The calculation method of the path metric in each state of the time t based on the path metric update circuit 42, the path metric selection circuit 43 and the path metric comparison circuit 46 are same to those of the equations (9) to (14).

Similarly to the minimum value determination circuit 105, the minimum value determination circuit 44 compares the path metrics in the plurality of states held by the path metric selection circuit 43 and determines the minimum value. The minimum value determination circuit 44 outputs the signal, which indicates the state corresponding to the minimum value, as the determination result, to the path memory 45.

Similarly to the path memory 106, the path memory 45 holds the path selected by the path metric selection circuit 43, as a path information indicated with the channel bit, in accordance with the selection signal outputted by the path metric comparison circuit 46. Further, the path memory 45 receives the determination result of the minimum value determination circuit 44 and outputs the channel bit, which is the determined path information, as the determination data.

The path metric comparison circuit 46 receives a plurality of path metrics subjected to the comparison from the path metric update circuit 42 and receives the offset value from the bias output circuit 47. The path metric comparison circuit 46 does not compare the magnitudes of respective path metrics of two merging paths directly, but compares them by adding an offset value to one of the path metrics. The path metric comparison circuit 46 outputs a selection signal indicating the comparison result.

Figure 5A:
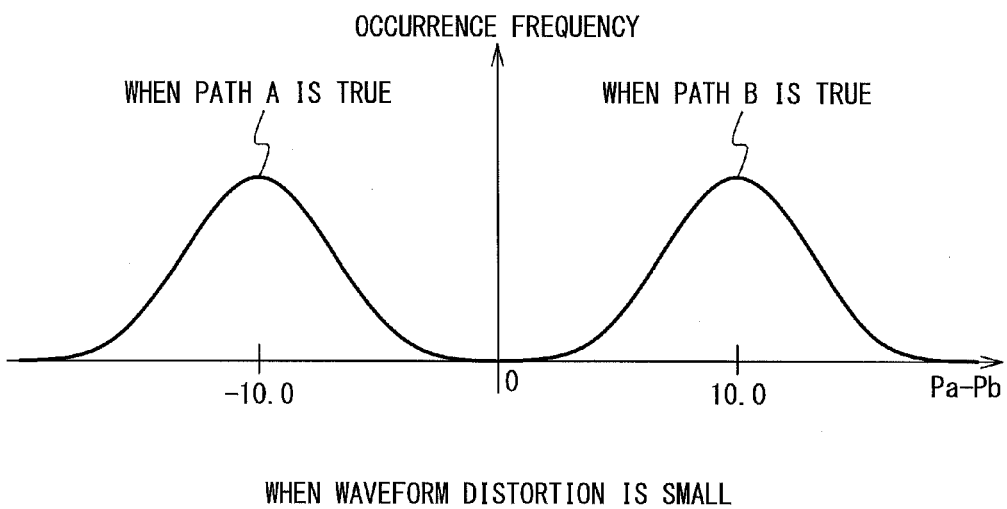
FIG. 5A is a view showing the distribution of the path metric difference Pa−Pb when two paths are assumed to be a path A and a path B and then the path metrics of the respective paths are assumed to be Pa and Pb.
Figure 5B:
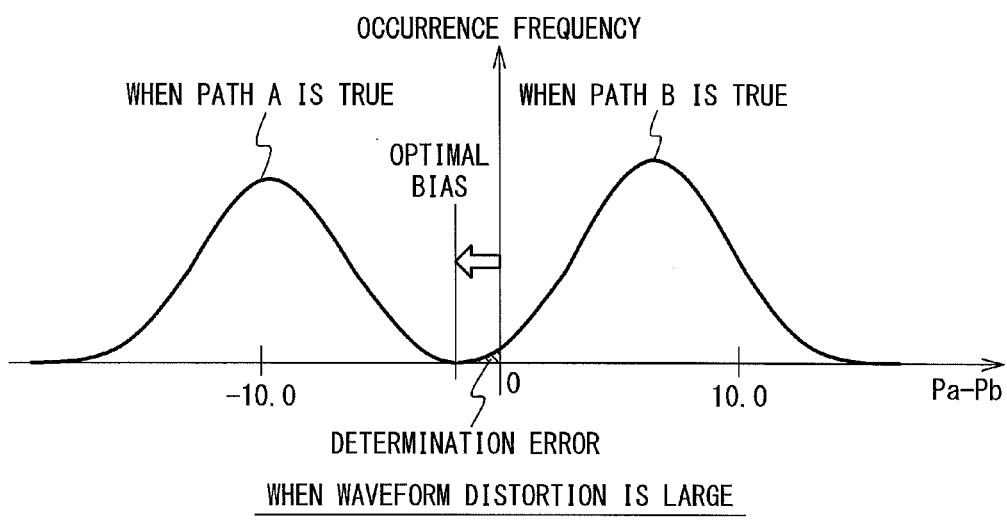
FIG. 5B is a view showing the distribution of the path metric difference Pa−Pb when the two paths are assumed to be the path A and the path B and then the path metrics of the respective paths are assumed to be Pa and Pb.

When two paths merge in a certain state, each path metric of the two paths is distributed such that the path metric when the two paths have the ideal waveforms is central. FIGS. 5A and 5B are the views showing the distribution of the path metric difference Pa−Pb when the two paths are assumed to be the path A and the path B and the path metrics of the respective paths are assumed to be Pa and Pb. The path metric difference between the ideal waveforms for the two paths is assumed to be 10.

FIG. 5A shows the case in which the waveform distortions of the path A and the path B are small. The distribution is such that two normal distributions having the peaks at two positions of ±10 are synthesized. The peak at −10 corresponds to the distribution of the path metric difference when the path A is true. The peak at +10 corresponds to the distribution of the path metric difference when the path B is true. When the distortion is small, the Viterbi detector 4 can select a probable path only on the basis of the magnitude relation between the Pa and the Pb, namely, on the basis of the sign of the path metric difference Pa−Pb.

However, when the waveform distortion is large, a deviation appears in the distribution of the path metric difference Pa−Pb, as shown in FIG. 5B. In this case, the skirt of the distribution of the path metric difference when the path B is true also appears in the region in which the path metric difference Pa−Pb is minus, and the determination error occurs in the region indicated with oblique lines. Then, when the distortion is large, there is a case that the path cannot be correctly determined only on the basis of the magnitude relation between the Pa and Pb.

The path metric comparison circuit 46 carries out the comparison after adding a value, which corresponds to the midpoint between the peaks of the two mountains which means the optimal bias as the offset value, to any one of the path metrics Pa and Pb, for example, the path metric Pb. Consequently, the Viterbi detector 4 can reduce the error of the path determination.

The trend and largeness of a waveform distortion are different depending on the reproduction signal group. The Viterbi detector 4 tables and holds the correspondence relation between the reproduction signal group and the optimal bias in the bias output circuit 47 in advance, in accordance with the reproduction signal group having the typical distortion. In short, the path metric comparison circuit 46 receives the optimal bias, which is based on the reproduction signal group, namely, based on the patterns (the channel bit sequences) of the two paths merging in a certain state, as the offset value from the bias output circuit 47 and adds the offset value to one of the path metrics and then compares the magnitude of the path metric between the two paths.

The bias output circuit 47 classifies the paths, which merge at the states S0, S1, S3 and S4, into patterns of the plurality of paths, respectively, and holds the optimal bias (the offset value) as a table for each pattern of the paths. The pattern of the path indicates the channel bit sequence of the two paths until they merge in a certain state.

The Viterbi detector 4, when carrying out the path determination at any time t, holds the path information based on a tentative determination result of the path prior to the time t−1, in the path memory 106. Then, the bias output circuit 47 receives the path information based on the tentative determination result prior to the time t−1, which is held in the path memory 106, and selects the optimal bias based on the pattern of the merging paths from the table and then outputs as the offset value. The path metric comparison circuit 46 adds the offset value, which is given by the bias output circuit 47, to one of the path metrics and carries out the path comparison. Thus, the Viterbi detector 4 can output the determination data of low error rate, from the reproduction signal including a waveform distortion.

Figure 6B:
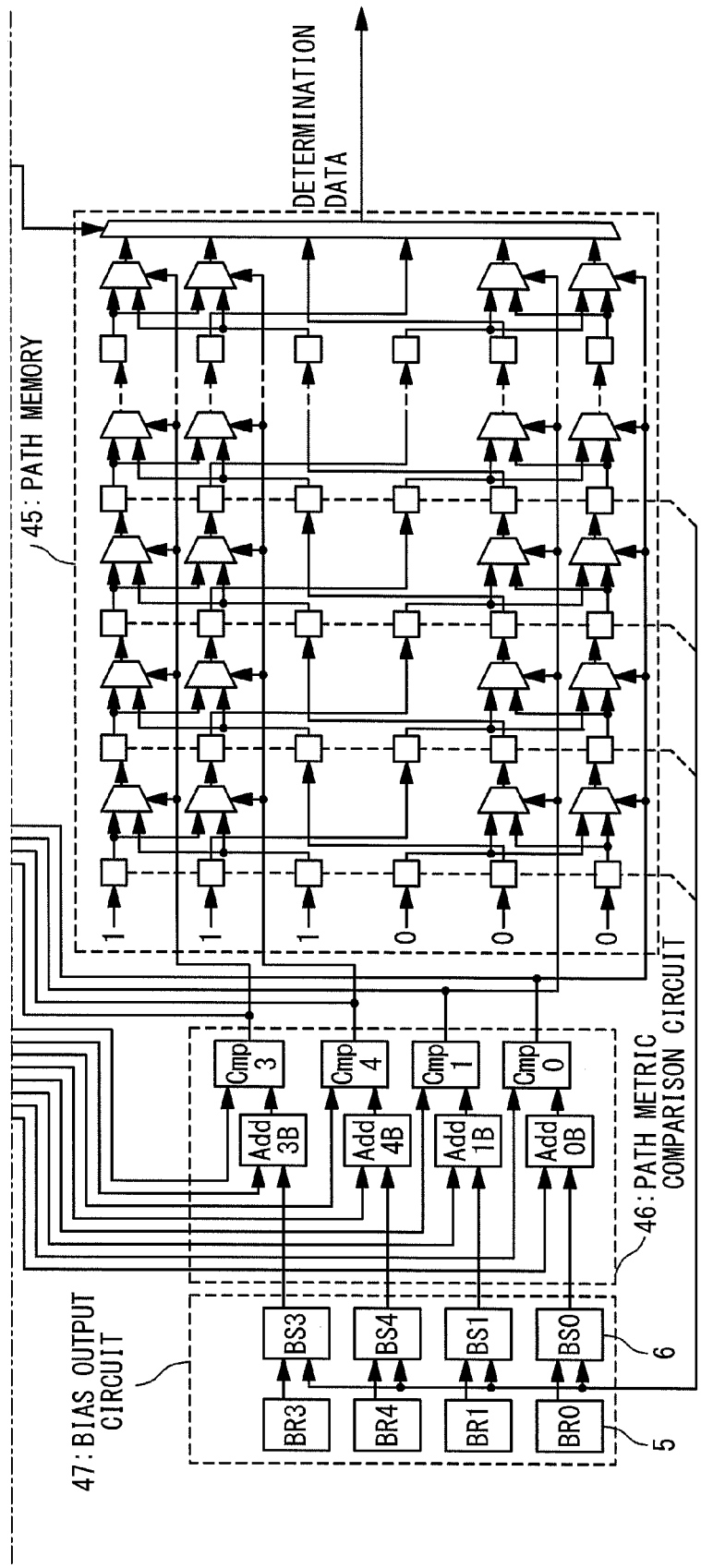
FIG. 6B is a view showing the detailed configuration of the Viterbi detector 4.

FIGS. 6A and 6B are the views showing the detailed configuration of the Viterbi detector 4. The configurations of the branch metric calculation circuit 41, the path metric update circuit 42, the path metric selection circuit 43 and the minimum value determination circuit 44 are similar to those of the Viterbi detector shown in FIGS. 3A and 3B. Thus, the detailed descriptions are omitted.

The path memory 45 is also similar to the path memory 106 in the Viterbi detector shown in FIGS. 3A and 3B and includes a plurality of registers (the rectangular blocks on the drawings) installed in matrix and a plurality of selectors (the trapezoidal blocks on the drawing). Each of the plurality of registers holds the channel bit determination result corresponding to the survivor path as the path information for one bit, respectively. Then, the plurality of registers indicate the path information obtained by tracing back to the state S0, the state S1, the state S5, the state S2, the state S4 and the state S3, in the order from the lowest stage on the drawing. The register of the column of the left end in each stage exhibits the newest channel bit, and for each shift to the register of one column to the right, the path information that traces back one channel bit at a time is held. The path memory 45 outputs the value (the path information) of the register, which corresponds to the 5 columns from the left end, to the bias output circuit 47.

The bias output circuit 47 identifies the patterns of the paths, which merge at the states S0, S1, S3 and S4, namely, the channel bit sequences of the two paths until they merge in those states, in accordance with the value of the register received from the path memory 45. FIG. 7A is a table for indicating the classification of the patterns of the paths merging at the state S0 held by the bias output circuit 47. FIG. 7B is a table for indicating the classification of the patterns of the paths merging at the state S1 held by the bias output circuit 47. FIG. 7C is a table for indicating the classification of the patterns of the paths merging at the state S3 held by the bias output circuit 47. FIG. 7D is a table for indicating the classification of the patterns of the paths merging at the state S4 held by the bias output circuit 47.

With reference to FIG. 7A, the patterns of the paths merging at the state S0 are classified into 7 types in accordance with the combinations between the path information passing through the state S0 and the path information passing through the state S5 immediately before. The path information passing through the state S0 immediately before represented in the second column on the table in FIG. 7A is the arrangement of 5 channel bits obtained from the lowest stage of the path memory 45. The values of 5 bits are arranged with the passage of time in the order from the left side on the table. The numeral "[00]" represented at the tail indicates that in the path merging at the state S0, the subsequent two channel bits become always "00". These two bits do not depend on the output of the path memory 45. The symbol "X" in the table indicates that the channel bit may be "0" or "1" and undetermined. Similarly, the path information passing through the S5 immediately before is indicated in the third column on the table. This is the arrangement of the 5 channel bits outputted from the register on the third stage from the bottom in the path memory 45.

The fourth column on the table in FIG. 7A indicates the path metric difference obtained between the ideal waveforms of the merging two paths. When the merging paths are classified as indicated on the table, there can be the plurality of patterns having the different paths prior to the 5 channel bits. The path metric difference indicates the value between the paths with which the difference becomes minimum among them. When the distortion is small in the reproduction signal, the path metric difference between the two paths merging at the state S0 has the peaks of the distribution at plus and minus positions, which correspond to the path metric differences between the ideal waveforms on the basis of the classified patterns. For example, the peaks appear at ±36 in the pattern of the path of the classification number 1, and the peak appears at ±10 in the pattern of the path of the classification number 2. However, when there is a distortion depending on the record pattern, a deviation occurs at the peak position.

The bias output circuit 47 holds a plurality of optimal biases corresponding to the patterns of the paths therein. Then, the bias output circuit 47 switches the optimal bias to be outputted corresponding to the merging state and the pattern of the paths. The optimal bias is preset in accordance with the pattern of the path determined by the channel bit sequence and the distribution of the path metric differences.

With reference to FIG. 6B, the bias output circuit 47 includes a plurality of bias registers (BR0, BR1, BR3 and BR4) 5 and a plurality of bias selectors (BS0, BS1, BS3 and BS4) 6. The respective bias registers 5 hold: the patterns of the plurality of paths that are the combinations of the two path information included in the plurality of path information; and the plurality of offset values correlated to the patterns of the plurality of paths, respectively, in the plurality of path information in which the plurality of paths merging in respective states are indicated with the channel bits. The BR0 in the bias registers 5 holds the optimal biases (offset values) corresponding to the patterns of the 7 types which merge at the state S0 and outputs to the BS0 in the bias selectors 6. The BS0 in the bias selectors 6 selects one from the optimal biases of the 7 types outputted by the BR0, in accordance with the path information received from the path memory 45 and outputs as the offset value to the path metric comparison circuit 46.

The path metric comparison circuit 46 includes a plurality of adders (Add0B, Add1B, Add3B and Add4B) and a plurality of comparators (Cmp0, Cmp1, Cmp3 and Cmp4). Each of the adders adds the offset value, which is outputted by the bias output circuit 47, to one of the path metrics outputted by the path metric update circuit 42. After that, each comparator compares the path metrics. With reference to FIGS. 6A and 6B, the adder Add0B adds the offset value, which is outputted by the BS0 in the bias selectors 6, to the path metric outputted by the adder Add00 in the path metric update circuit 42. Then, the comparator Cmp0 compares the magnitudes between the path metric to which the offset value is added and the path metric outputted by the adder Add51 in the path metric update circuit 42. The comparator Cmp0 outputs the selection signal indicating the comparison result to the path metric selection circuit 43 and the path memory 45.

In the path selection in the path metric comparison circuit 46, the offset value is added. Thus, the likelihood of the path selection is changed depending on the offset value. However, the offset value is not added to the path metric received by the path metric selection circuit 43, namely, the path metric received from the path metric update circuit 42. Hence, in the Viterbi detector 4, the problem that the deviation in the path metric has influence on the subsequent path selection does not occur.

In the above, the operations have been indicated by exemplifying the selection of the path merging at the state S0. Similarly, the bias output circuit 47 holds the optimal bias, in accordance with the patterns on the tables in FIGS. 7B to 7D, even in the cases of two paths merging at the states S1, S3 and S4, respectively. That is, the respective BR1, BR3 and BR4 belonging to the bias selectors 6 in the bias output circuit 47 output a plurality of offset values based on the patterns of the paths. Then, the respective BS1, BS3 and BS4 in the bias selectors 6 select one from the plurality of offset values in accordance with the path information given from the path memory 45 and output as the offset value. The path metric comparison circuit 46 adds the offset value and compares the path metrics. With this sequence of operations, the Viterbi detector 4 can reduce errors of the path selection.

The patterns of the paths passing through the state S0 immediately before they merge at the state S1 indicated in the second and third columns on the table in FIG. 7, and the pattern of the path passing through the state S5 are obtained with the 5 channel bits, which are outputted from the registers on the lowest stage of the path memory 45 and the third stage from the bottom, respectively, similarly to the table in FIG. 7A. Also, the patterns of the paths passing through the state S3 or S2 immediately before they merge at the state S3 or state S4 which are indicated in the second and third columns on the table in FIGS. 7C and 7D are obtained with the 5 channel bits which are outputted from the registers on the highest stage of the path memory and the third stage from the top, respectively.

Figure 8:
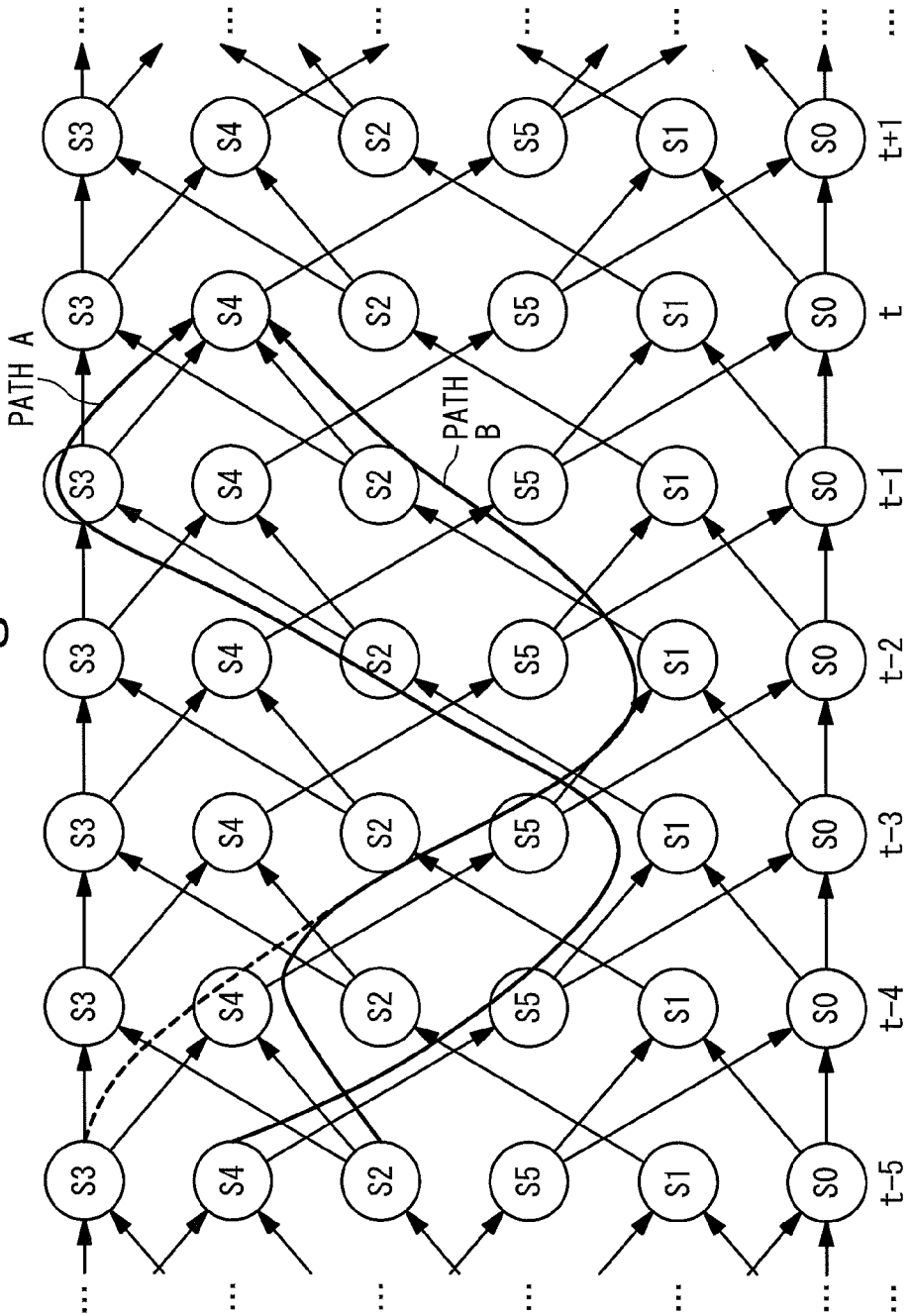
FIG. 8 is a view showing two paths, in accordance with one classification of patterns of merging paths.

FIG. 8 is a view showing the two paths, in accordance with one class of the patterns of the merging paths. With reference to FIG. 8, the two paths A, B merging at the state S4 are shown. The paths A, B indicate the class indicated by the classification number 7 on the table in FIG. 7D. The path A passes through the state S3 at the time t−1 and merges at the state S4, and its channel bit sequence until the time t−1 from the time t−5 given from the path memory 45 becomes "10011". As mentioned above, the states S0, S1 and S5 indicate the channel bit "0", and the states S2, S3 and S4 indicate the channel bit "1". A path corresponding to the channel bit sequence "10011" always passes through the state S4 at the time t−5. On the other hand, the path B passes through the state S2 at the time t−1 and merges at the state S4, and its channel bit sequence until the time t−1 from the time t−5 becomes "11001". As a path satisfying this condition, there is the path that passes through the state S3 at the time t−5 indicated by a dotted line, in addition to the path that passes through the state S2 at the time t−5 indicated by an arrow mark of a solid line as the path B. Whether the path of the solid line or the path passing through the dotted line is selected as the path B is determined when the path merging at the state S4 at the time t−4 is selected. For this reason, at the time t, the respective one path A and path B are targeted, and the path selection merging at the state S4 is proceeded.

The optimal bias is predetermined on the basis of the distribution of the path metric difference Pa−Pb, assuming that Pa is the path metric corresponding to the path A and Pb is the path metric corresponding to the path B. As for the path metric difference Pa−Pb, the peak position becomes a value close to −12 when the path A is true, and a value close to +12 when the path B is true. However, the influence of the distortion causes a deviation of the peak of the distribution.

Figure 9A:
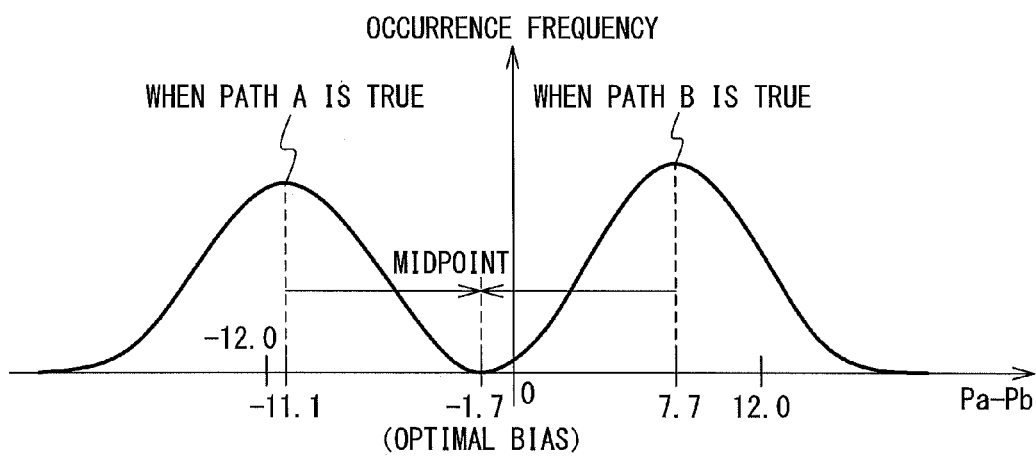
FIG. 9A is a view showing the distribution of the path metric difference Pa−Pb when a distortion is included in the waveform of a reproduction signal.
Figure 9B:
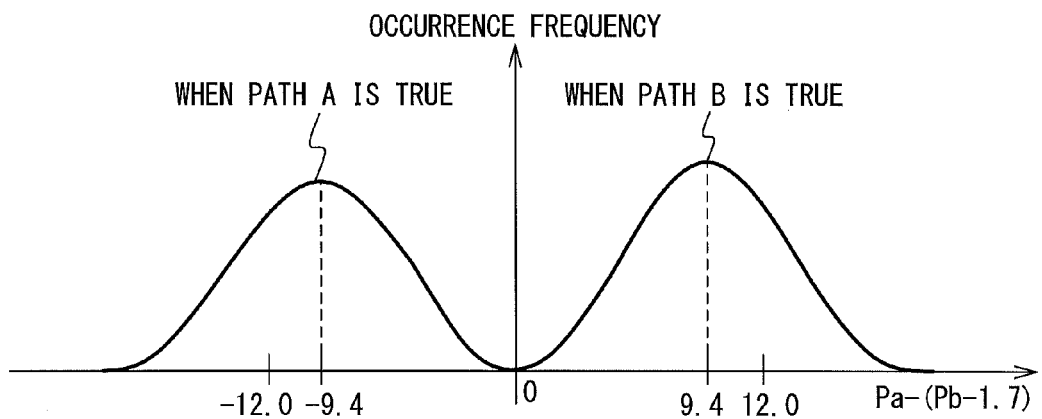
FIG. 9B is a view showing the distribution of the path metric difference when an offset value is added to the Pb of the path metric.

FIG. 9A is a view showing the distribution of the path metric difference Pa−Pb when a distortion is included in the waveform of a reproduction signal. With reference to FIG. 9A, the minus peak position when the path A is true is deviated to −11.1, and the plus peak position when the path B is true is deviated to +7.7. The optimal bias in this case becomes −1.7 being the midst position between both peak positions. The BR4 in the bias registers 5 holds −1.7 in advance as the optimal bias corresponding to the pattern in this path and outputs the plurality of offset values including the held optimal bias. The BS4 in the bias selectors 6, when selecting that the patterns of the paths merging at the state S4 are the path A and the path B, extracts −1.7 as the offset value and outputs it. The path metric comparison circuit 46 adds the offset −1.7 to the path metric Pb and carries out the comparison. FIG. 9B is the view showing the distribution of the path metric difference when the offset value is added to the path metric Pb. With reference to FIG. 9B, the distribution of the path metric difference when the offset is added to the path metric Pb becomes approximately symmetrical. Thus, the Viterbi detector 4 in the present embodiment can reduce the determination error by determining the path in accordance with the magnitude relation between Pa and (Pb−1.7).

In the above embodiment, patterns of the merging paths are classified by referring to the 5 channel bits from the path memory 45. However, when the pattern dependency of the waveform distortion is more complex, the number of the channel bits to be referred may be increased for classification.

Also, the following process can be adopted. Patterns in which large distortion is unlikely to occur and patterns in which the path metric difference between the merging paths is large and an error is unlikely to occur are collectively classified, and the corresponding optimal bias is treated as 0. In such cases, they can be removed from the process of adding the offset value.

As explained above, in this embodiment of the present invention, the Viterbi method is performed. In the Viterbi method, branch metrics are calculated based on a difference of a sampled reproduction signal and a predetermined expectation values. Path metrics are calculated from the branch metrics. Paths among the plurality of paths having the calculated path metrics and merging at a same state are compared with one another. Based on the magnitude of the compared path metrics, survivor path is selected. In the circuit, for the path metrics of paths merging at a same state, offset corresponding to a determination result until a merging point is added to the paths for the comparison for determining the survivor path from the plurality of merging paths.

Second Embodiment

Figure 1:
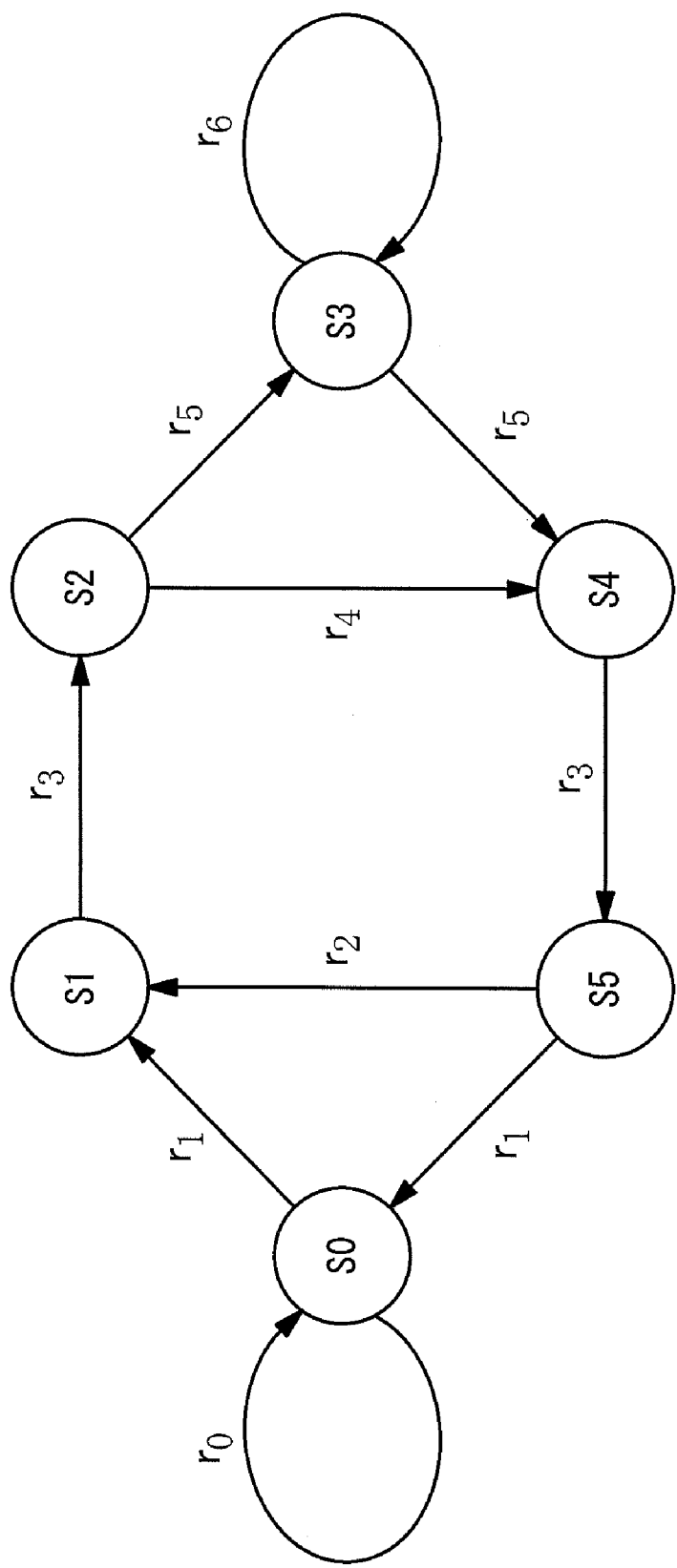
FIG. 1 is a state transition diagram of a reproduction signal sequence that is sampled at a channel bit interval, when as the modulation code, the code in which the minimum code inversion interval is 2 is used to carry out the recording/reproducing operation, and the reproduction signal is PR (a, b, b, a) equalized.
Figure 2:
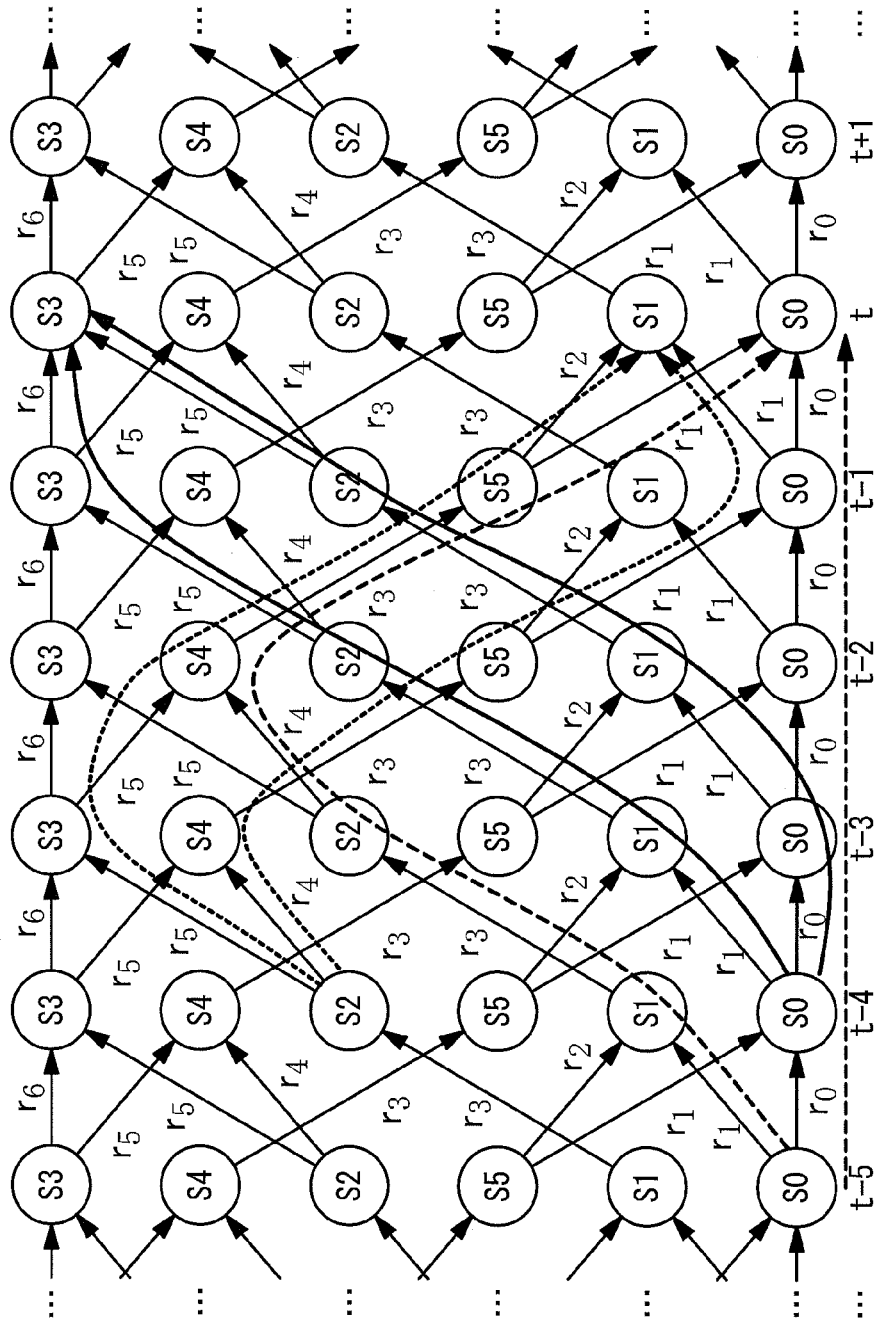
FIG. 2 is a trellis diagram that is obtained by developing the state transition diagram in FIG. 1 in the time axis direction.
Figure 10:
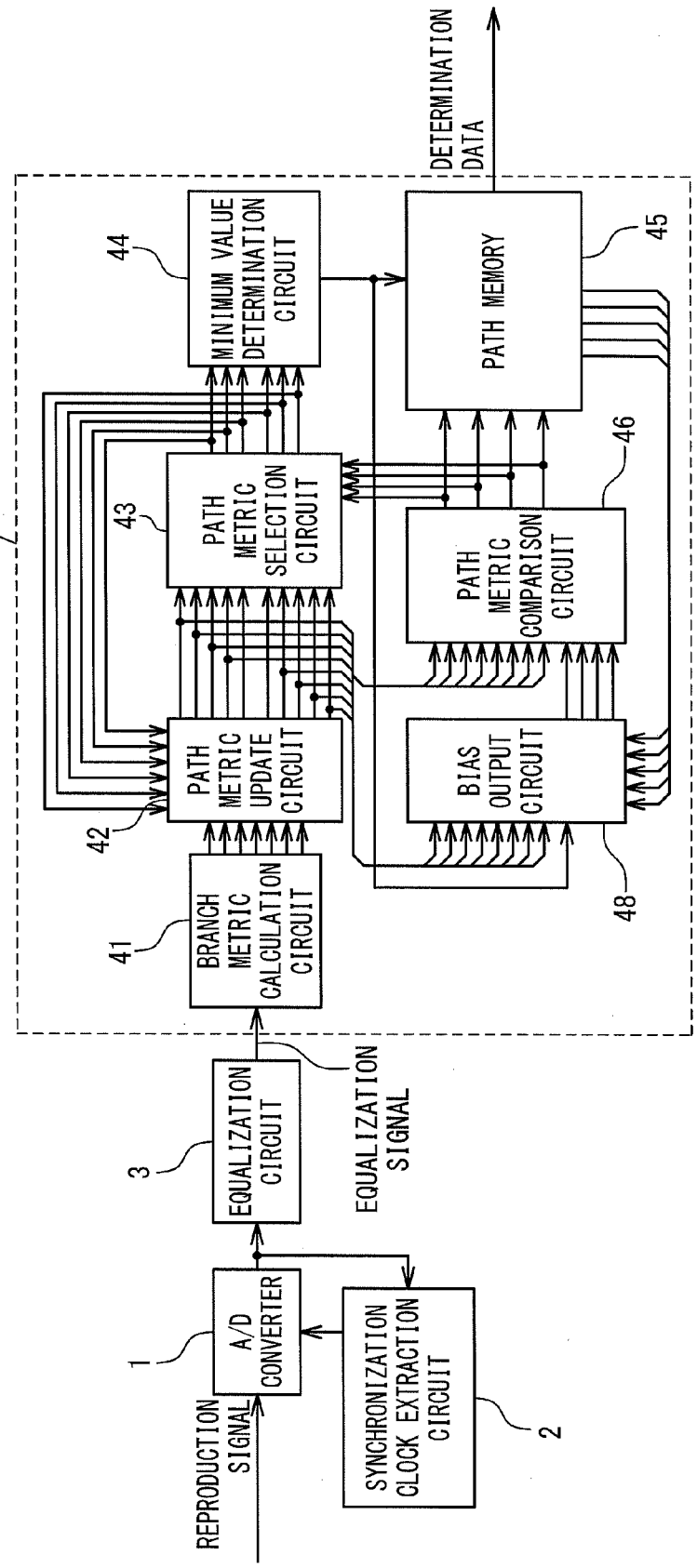
FIG. 10 is a block diagram of an information reproduction apparatus according to a second embodiment of the present invention.

A second embodiment of the present invention will be described below. FIG. 10 is a block diagram of the information reproduction apparatus according to the second embodiment of the present invention. With reference to FIG. 10, the information reproduction apparatus contains an A/D converter 1, a synchronous clock extraction circuit 2, an equalization circuit 3 and a Viterbi detector 4. The operations of the A/D converter 1, the synchronous clock extraction circuit 2 and the equalization circuit 3 are similar to those of the first embodiment. Also, the Viterbi detector 4 is operated similarly to that of the first embodiment except that the bias output circuit 47 in FIG. 1 is replaced with a bias output circuit 48.

The bias output circuit 48 receives path information from the path memory 45 similarly to the bias output circuit 47. Moreover, the bias output circuit 48 receives: the path metric of the merging path from the path metric update circuit 42; and the signal indicating the state in which the path metric is minimum, from the minimum value determination circuit 44. Then, the bias output circuit 48 has a function for updating the optimal bias in response to the distortion included in the reproduction signal and outputting it as the offset value.

Figure 11A:
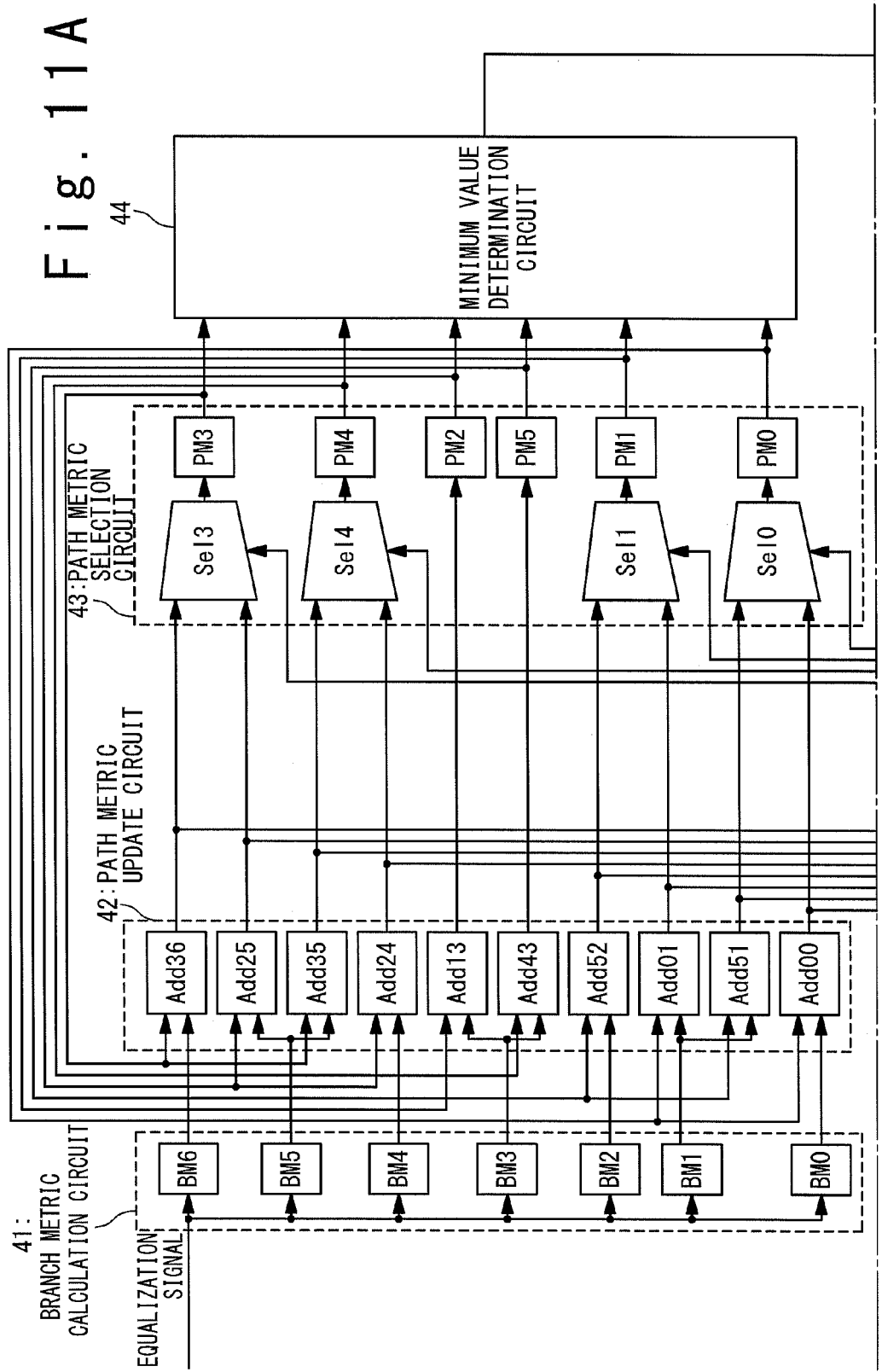
FIG. 11A is a view showing a detail of the Viterbi detector 4 according to the second embodiment of the present invention.
Figure 11B:
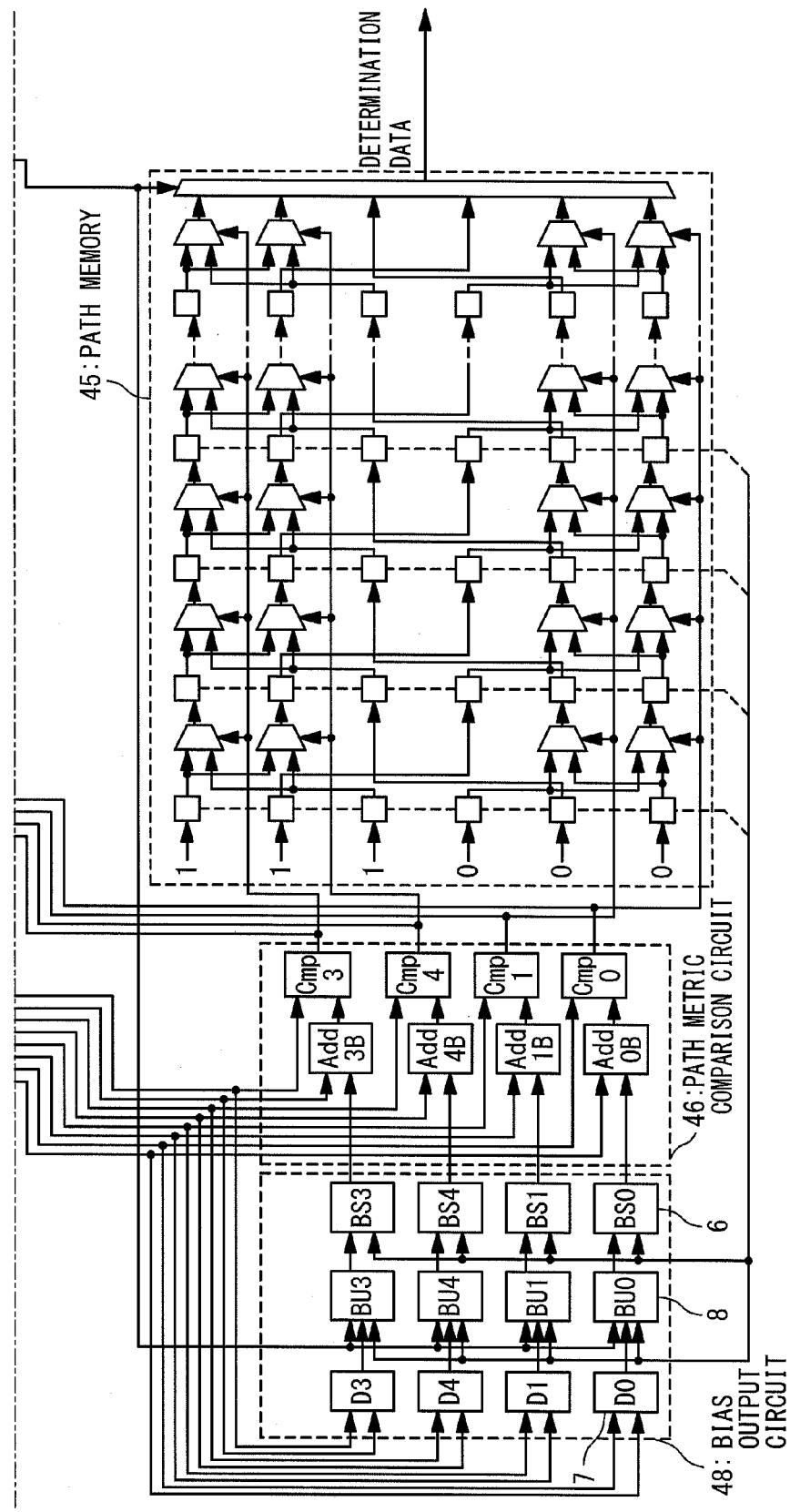
FIG. 11B is a view showing the detail of the Viterbi detector 4 according to the second embodiment of the present invention.

FIGS. 11A and 11B are views showing a detail of the Viterbi detector 4 according to the second embodiment of the present invention. Similarly to the first embodiment, it is assumed that the minimum code inversion interval is 2 and a signal that is PR (a, b, b, a) equalized is Viterbi-detected as an example. The branch metric calculation circuit 41, the path metric update circuit 42, the path metric selection circuit 43 and the minimum value determination circuit 44 are operated similarly to the circuits shown in FIGS. 3A and 3B.

The bias output circuit 48 contains a plurality of bias selectors (BS0, BS1, BS3 and BS4) 6, a plurality of subtracters (D0, D1, D3 and D4) 7 and a plurality of bias update registers (BU0, BU1, BU3 and BU4) 8. The plurality of bias selectors 6 are similar to those of the first embodiment. Each of the plurality of subtracters 7 receives the path metrics of every two paths, which merge in each of the states S0, S1, S3 and S4, from the path metric update circuit 42 and calculates the path metric difference. Each of the plurality of bias update registers 8 holds the path metric difference given by each subtracter 7 at a time immediately before, and updates the inner state by using the path metric difference when a path of the minimum path metric is included. The information indicating that the path of the minimum path metric corresponds to the path which leads to whether of the states is passed as the minimum value determination result from the minimum value determination circuit 44 to the respective bias update registers 8.

Figure 12:
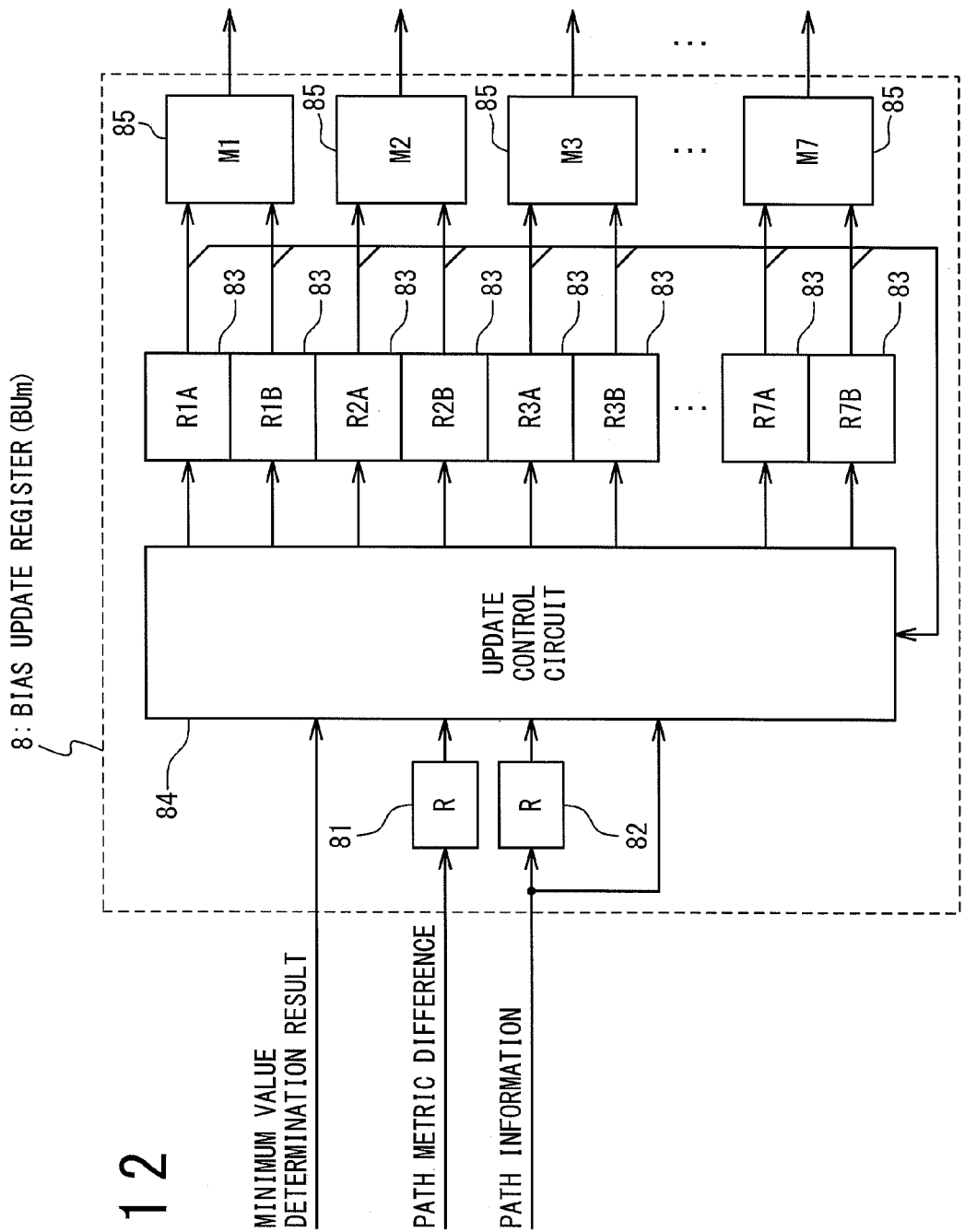
FIG. 12 is a view showing a configuration of a bias update register (BUm) 8.

FIG. 12 is a view showing the configuration of the bias update register (BUm) 8. With reference to FIG. 12, the bias update register (BUm) 8 includes a register 81, a register 82, a plurality of registers (R1A, R1B, R2A, - - - R7B) 83, an update control circuit 84 and a plurality of midpoint calculation circuits (M1, M2, M3, - - - M7) 85. When the path having the minimum path metric at the time t is in the state Sm, the bias update registers (BUm) 8 is updated in accordance with the path metric difference between two paths that lead to the state Sm at the time t.

The register 81 holds the path metric difference. The register 82 holds the path information. Each of the plurality of registers (R1A, R1B, R2A, - - - R7B) 83 holds the average value of the path metric difference distributions updated in accordance with the patterns of merging paths and the path selected from the merging two paths. The patterns of merging paths are classified in accordance with the tables indicated in FIGS. 7A to 7D similarly to the first embodiment.

The update control circuit 84, when receiving the minimum value determination result indicating that the path having the minimum path metric at the time t is in the state Sm, identifies the pattern of the merging path, in accordance with the path information of the time t−1 held by the register 82. That is, the update control circuit 83 performs identification in accordance with the classification numbers 1 to 7 included in the plurality of registers 83. Moreover, the update control circuit 84 identifies the path selected from the two paths that lead to the state Sm, in accordance with the path information of the time t, which is directly received without passing through the register 82. That is, the update control circuit 84 performs identification whether of the paths A and B, in the respective classification numbers included in the plurality of registers 83. In this way, the update control circuit 84 determines the value of the register to be updated, in the plurality of registers 83 holding the average value of the distributions.

The Viterbi detector 4 exhibits the trellis diagram shown in FIG. 8, similarly to the first embodiment. The two paths merging at the state Sm are classified into a classification number k. Then, in the trellis diagram in FIG. 8, when the path merging at the state Sm from above is selected, a register RkA is targeted for the update, and when the path merging at the state Sm from below is selected, a register RkB is targeted for the update. The update control circuit 84 reads the value of the register 83 targeted for the update and adds the difference of about 0.1% from the path metric difference between the two paths held by the register 81 and again performs writing to the register 83 targeted for the update. Consequently, the effect of smoothing the value of the path metric difference for each classified pattern is achieved, and each register 83 targeted for the update has an approximate average value of distribution. When the distribution is close to the normal distribution, the average value and the peak position are approximately coincident.

Each of the plurality of midpoint calculation circuits (M1, M2, M3, - - - M7) 85 receives the average value of the path metric difference distributions for each pair classified into a same pattern, from the corresponding registers 83 (R1A, R1B, R2A, - - - R7B). Each of the plurality of midpoint calculation circuits 85 calculates a midpoint and outputs the offset value as the optimal bias corresponding to each classification pattern.

The offset value outputted by the bias update registers (BUm) 8 is selected on the basis of the classification pattern of the path by the BR0, BR1, BR3 and BR4, similarly to the bias selector 6 in the first embodiment, and passed to the path metric comparison circuit 46 for the path metric comparison. The path metric comparison circuit 46 and the path memory 45 are operated similarly to those of the first embodiment. Consequently, an offset value is appropriately selected on the basis of the deviation quantity, from the reproduction signal in which the deviation is generated in the distribution of the path metric difference due to distortion. Thus, the data determination is proceeded at a low error rate.

In the explanation of some exemplary embodiments in this specification, it is assumed that the PR (a, b, b, a) is exemplified as the partial response characteristic. However, the constraints of the equalization property and the code are not limited to them. This technique can be applied to Viterbi detectors that have various constraints of equalization properties and codes in response to a reproduction channel.

Although the present invention has been described above in connection with several embodiments thereof, it would be apparent to those skilled in the art that those exemplary embodiments are provided solely for illustrating the present invention, and should not be relied upon to construe the appended claims in a limiting sense.

What is claimed is:

1. An information reproduction apparatus comprising:
  a branch metric calculation part configured to receive an equalization signal being obtained by applying a waveform equalization to a sampled reproduction signal sequence, and to calculate a plurality of branch metrics based on a sample value of the equalization signal at a time t and a plurality of expectation values;
  a path metric update circuit configured to calculate a third path metric from a first branch metric included in the plurality of branch metrics and a first path metric being correlated to a first state at a time t−1 based on the plurality of branch metrics, the first path metric and a second path metric being correlated to a second state at the time t−1, and to calculate a fourth path metric from a second branch metric included in the plurality of branch metrics and the second path metric;
  a path memory configured to hold first path information indicating a first path being correlated to the first state at the time t−1 represented by a channel bit sequence, and second path information indicating a second path being correlated to the second state at the time t−1 represented by a channel bit sequence;
  a bias output circuit configured to output a first offset value based on the first path information and the second path information which are received from the path memory; and
  a path metric selection circuit configured to perform a selection among either of the third path metric or the fourth path metric, and to hold a result of the selection with correlating to a third state at the time t.

2. The information recording apparatus according to claim 1, wherein the bias output circuit comprises:
  a bias register configured to hold a pattern of a plurality of paths being a combination of two pieces of path information among a plurality of pieces of information indicating a plurality of paths merging at the third state by a channel bit, and a plurality of offset values respectively correlated to the pattern of the plurality of paths; and
  a bias selector configured to select a pattern of a first path from the pattern of the plurality of patterns based on the first path information and the second path information, and to output the first offset value being correlated to a pattern of the first path.

3. The information reproduction apparatus according to claim 2, wherein the bias register is configured to hold the first offset value being calculated based on a path metric difference between a third path corresponding to a pattern of the first path merging at the third state and transiting from the first path to the third state and a fourth path transiting from the second path to the third state.

4. The information reproduction apparatus according to claim 3, wherein the bias register is configured to hold the first offset value being calculated based on a first peak being a peak of a distribution of the path metric difference when the third path is true and a second peak being a peak of a distribution of the path metric difference when the fourth path is true.

5. The information reproduction apparatus according to claim 3, wherein the bias register further comprises:
a midpoint calculation circuit configured to calculate a midpoint of a first average value being an average value of a distribution of the path metric difference when the third path is true and a second average value being an average value of a distribution of the path metric difference when the fourth path is true, and to output the midpoint as the first offset value.

6. The information reproduction apparatus according to claim 5, wherein the bias output circuit comprises:
a subtractor configured to calculate a first path metric difference being a path metric difference between the second path metric and the fourth path metric,
wherein the bias register comprises:
an update control circuit configured to select a pattern of the first path from a pattern of a plurality of paths based on the first path information and the second path information, and to update the first offset value by adding the first path metric difference to either one of the first average value or the second average value based on third path information of the third path or fourth path information of the fourth path each of which is a path at the time t and held in the path memory.

7. An information reproduction method comprising:
receiving an equalization signal being obtained by applying a waveform equalization to a sampled reproduction signal sequence;
calculating a plurality of branch metrics based on a sample value of the equalization signal at a time t and a plurality of expectation values;
calculating a third path metric from a first branch metric included in the plurality of branch metrics and a first path metric being correlated to a first state at a time t−1 based on the plurality of branch metrics, the first path metric and a second path metric being correlated to a second state at the time t−1;
calculating a fourth path metric from a second branch metric included in the plurality of branch metrics and the second path metric;
holding first path information indicating a first path being correlated to the first state at the time t−1 represented by a channel bit sequence, and second path information indicating a second path being correlated to the second state at the time t−1 represented by a channel bit sequence;
outputting a first offset value based on the first path information and the second path information which are received from the path memory; and
performing a selection among either of the third path metric or the fourth path metric, and to hold a result of the selection with correlating to a third state at the time t.

8. The information reproduction method according to claim 7, wherein the outputting the first offset value comprises:
holding a pattern of a plurality of paths which is a combination of two pieces of path information among a plurality of pieces of information indicating a plurality of paths merging at the third state by a channel bit, and a plurality of offset values respectively correlated to the pattern of the plurality of paths;
selecting a pattern of a first path from the pattern of the plurality of patterns based on the first path information and the second path information; and
outputting the first offset value being correlated to a pattern of the first path.

9. The information reproduction method according to claim 8, wherein the first offset value is calculated based on a path metric difference between a third path corresponding to a pattern of the first path merging at the third state and transiting from the first path to the third state and a fourth path transiting from the second path to the third state.

10. The information reproduction method according to claim 9, wherein the first offset value is calculated based on a first peak being a peak of a distribution of the path metric difference when the third path is true and a second peak being a peak of a distribution of the path metric difference when the fourth path is true.

11. The information reproduction method according to claim 9, wherein the outputting the first offset value being correlated to a pattern of the first path comprises:
calculating a midpoint of a first average value being an average value of a distribution of the path metric difference when the third path is true and a second average value being an average value of a distribution of the path metric difference when the fourth path is true; and
outputting the midpoint as the first offset value.

12. The information reproduction method according to claim 11, further comprising:
calculating a first path metric difference being a path metric difference between the second path metric and the fourth path metric;
selecting a pattern of the first path from a pattern of a plurality of paths based on the first path information and the second path information; and
updating the first offset value by adding the first path metric difference to either one of the first average value or the second average value based on third path information of the third path or fourth path information of the fourth path each of which is a path at the time t and held in the path memory.

* * * * *